US012027042B2

(12) United States Patent
Hagihara et al.

(10) Patent No.: US 12,027,042 B2
(45) Date of Patent: Jul. 2, 2024

(54) ROAD INFORMATION PROVIDING SYSTEM AND ROAD INFORMATION PROVIDING METHOD

(71) Applicant: HONDA MOTOR CO., LTD., Tokyo (JP)

(72) Inventors: Tomoaki Hagihara, Tokyo (JP); Ryusuke Tamanaha, Tokyo (JP); Shigeyuki Odashima, Tokyo (JP); Kousuke Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 17/581,324

(22) Filed: Jan. 21, 2022

(65) Prior Publication Data

US 2022/0277648 A1 Sep. 1, 2022

(30) Foreign Application Priority Data

Feb. 26, 2021 (JP) ................................ 2021-030424

(51) Int. Cl.
 *G08G 1/01* (2006.01)
 *G06V 20/58* (2022.01)
 *G08G 1/16* (2006.01)

(52) U.S. Cl.
 CPC ........... *G08G 1/0141* (2013.01); *G06V 20/58* (2022.01); *G08G 1/0112* (2013.01);
 (Continued)

(58) Field of Classification Search
 CPC .. G08G 1/0141; G08G 1/0112; G08G 1/0133; G08G 1/0145; G08G 1/162;
 (Continued)

(56) References Cited

U.S. PATENT DOCUMENTS

| 2010/0174482 A1 | 7/2010 | Sugawara et al. |
| 2013/0021170 A1* | 1/2013 | Anderson ............ G08G 1/0116 340/905 |
| 2020/0011689 A1 | 1/2020 | Tatsumi |

FOREIGN PATENT DOCUMENTS

| CN | 101689333 A | 3/2010 |
| CN | 101866168 A | 10/2010 |

(Continued)

OTHER PUBLICATIONS

Chinese Office Action corresponding to CN Application No. 202210036498.1, dated Aug. 11, 2023, 11 pages.

(Continued)

*Primary Examiner* — Jacob M Amick
*Assistant Examiner* — Charles J Brauch
(74) *Attorney, Agent, or Firm* — Rankin, Hill & Clark LLP

(57) ABSTRACT

A road information providing system includes: a first traffic state recognition unit that recognizes a first traffic state that is a traffic state of first-type movable bodies; a second traffic state recognition unit that recognizes a second traffic state that is a traffic state of second-type movable bodies smaller in size than the first-type movable bodies; a specific road area extraction unit that extracts, as a specific road area, a road area satisfying traffic determination conditions including a determination condition that the first traffic state shows that a traffic volume of the first-type movable bodies has decreased and a determination condition that the second traffic state shows that the second-type movable body is traveling; and a traveling obstruction information providing unit that provides traveling obstruction information serving as notification that an event has occurred which obstructs the traveling of the first-type movable bodies in the specific road area.

6 Claims, 3 Drawing Sheets

(52) U.S. Cl.
CPC ......... *G08G 1/0133* (2013.01); *G08G 1/0145* (2013.01); *G08G 1/162* (2013.01); *G08G 1/166* (2013.01)

(58) Field of Classification Search
CPC .... G08G 1/166; G08G 1/0116; G08G 1/0129; G08G 1/096716; G08G 1/096741; G08G 1/096775; G08G 1/096783; G06V 20/58; G06V 20/54
See application file for complete search history.

(56) References Cited

FOREIGN PATENT DOCUMENTS

| | | | | |
|---|---|---|---|---|
| CN | 102208137 A | * | 10/2011 | |
| CN | 102208137 A | | 10/2011 | |
| CN | 109255955 A | * | 1/2019 | ............... G08G 1/01 |
| CN | 109255955 A | | 1/2019 | |
| CN | 109974726 A | | 7/2019 | |
| CN | 112257488 A | | 1/2021 | |
| JP | 2011-209809 A | | 10/2011 | |
| JP | 2013-171317 A | | 9/2013 | |
| JP | 2021-009611 | | 1/2021 | |
| WO | 2018/179305 A1 | | 10/2018 | |

OTHER PUBLICATIONS

Japanese Office Action dated Apr. 23, 2024 issued in corresponding Japanese application No. 2021-030424; English machine translation included (11 pages).

* cited by examiner

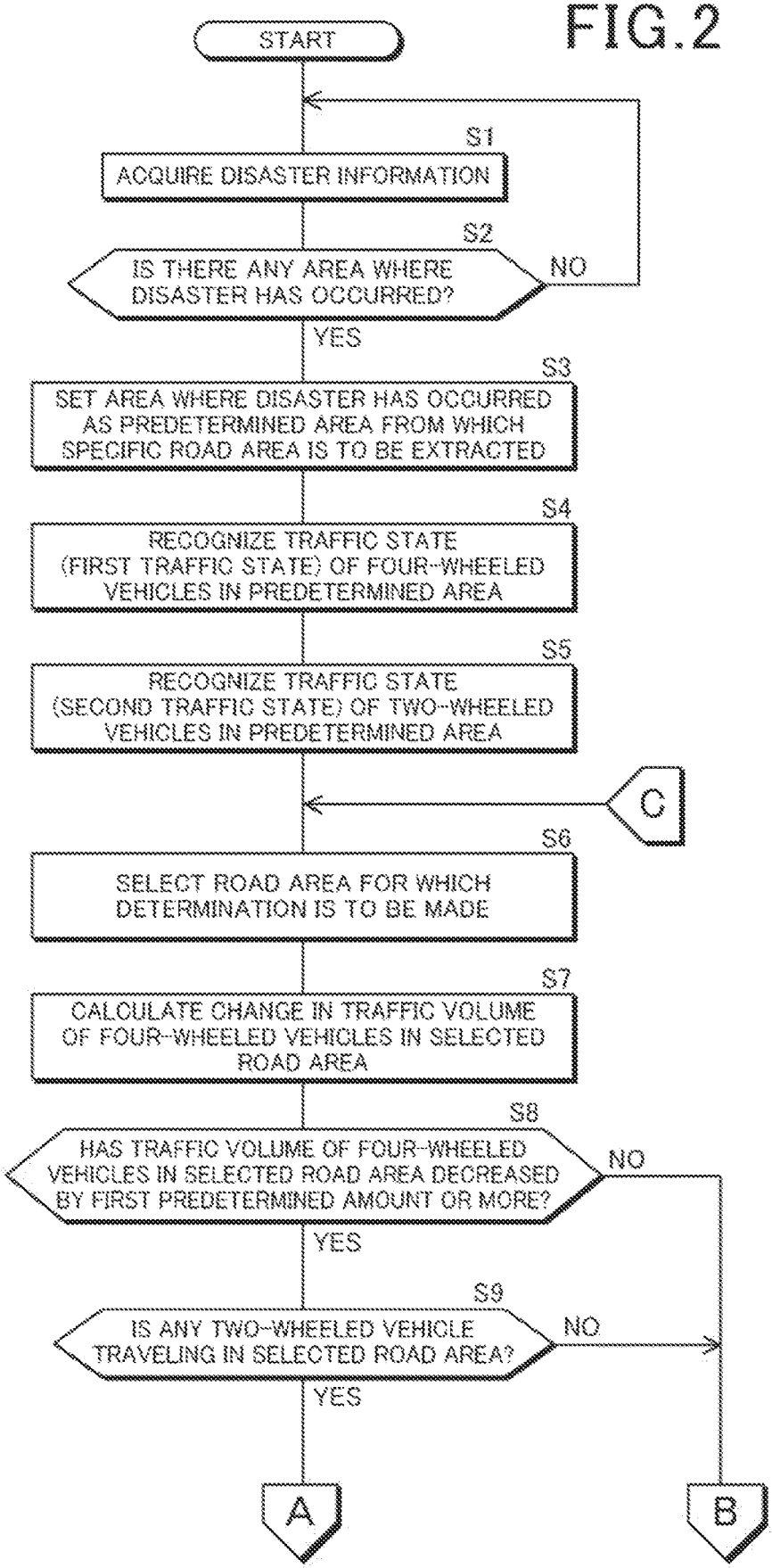

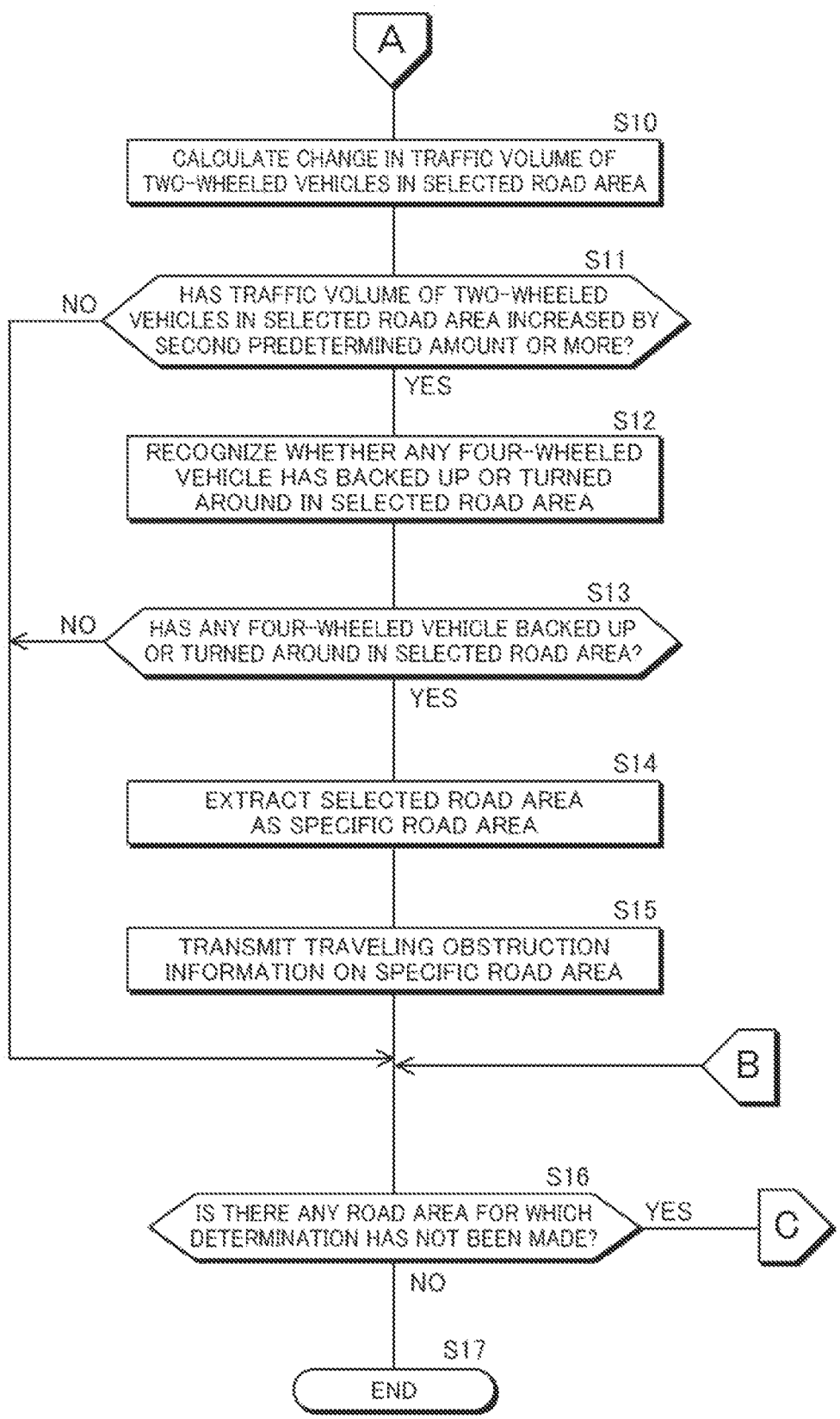

ROAD INFORMATION PROVIDING SYSTEM AND ROAD INFORMATION PROVIDING METHOD

INCORPORATION BY REFERENCE

The present application claims priority under 35 U.S.C. § 119 to Japanese Patent Application No. 2021-030424 filed on Feb. 26, 2021. The content of the application is incorporated herein by reference in its entirety.

BACKGROUND

Technical Field

The present invention relates to a road information providing system and a road information providing method.

Related Art

Conventionally, there has been proposed a system that recognizes an area which is not easily passable, by acquiring traveling history information transmitted from a vehicle traveling on a road, disaster information transmitted from an external device, and the like, and provides information on the area which is not easily passable (see, for example, JP 2021-9611 A).

SUMMARY

According to the above system, information on a road that is not easily passable can be provided to movable bodies. Meanwhile, when the road is partially impassable due to occurrence of a disaster or the like, some movable bodies can travel on the road depending on their size.

The present invention has been made in view of such a background, and an object of the present invention is to provide a road information providing system and a road information providing method capable of providing information as to whether a road is passable in accordance with the size of a movable body.

As a first aspect for achieving the above object, there is provided a road information providing system including: a first traffic state recognition unit that recognizes a first traffic state, the first traffic state being a traffic state of first-type movable bodies in a predetermined area; a second traffic state recognition unit that recognizes a second traffic state, the second traffic state being a traffic state of second-type movable bodies in the predetermined area, the second-type movable bodies being smaller in size than the first-type movable bodies; a specific road area extraction unit that extracts, as a specific road area, a road area that satisfies traffic determination conditions, the traffic determination conditions including a determination condition that it is recognized from the first traffic state that a traffic volume of the first-type movable bodies has decreased from a first reference amount by a first predetermined amount or more and a determination condition that it is recognized from the second traffic state that the second-type movable body is traveling; and a traveling obstruction information providing unit that provides traveling obstruction information serving as notification that an event has occurred which obstructs traveling of the first-type movable bodies in the specific road area.

The above-described road information providing system may be configured such that the traffic determination conditions further include a determination condition that the first-type movable body having backed up or turned around is recognized from the first traffic state.

The above-described road information providing system may be configured such that the traffic determination conditions further include a determination condition that it is recognized from the second traffic state that a traffic volume of the second-type movable bodies has increased from a second reference amount by a second predetermined amount or more.

The above-described road information providing system may be configured such that the traveling obstruction information includes a captured image of the specific road area.

The above-described road information providing system may be configured such that the second traffic state recognition unit acquires a captured image of the predetermined area transmitted from the second-type movable body traveling in the predetermined area, and recognizes the second traffic state based on the captured image having been acquired.

The above-described road information providing system may further include a disaster information acquisition unit that acquires disaster information; and a predetermined area setting unit that sets the predetermined area based on the disaster information.

As a second aspect for achieving the above object, there is provided a road information providing method to be performed by a computer, the method including: a first traffic state recognition step of recognizing a first traffic state, the first traffic state being a traffic state of first-type movable bodies in a predetermined area; a second traffic state recognition step of recognizing a second traffic state, the second traffic state being a traffic state of second-type movable bodies in the predetermined area, the second-type movable bodies being smaller in size than the first-type movable bodies; a specific road area extraction step of extracting, as a specific road area, a road area that satisfies traffic determination conditions, the traffic determination conditions including a determination condition that it is recognized from the first traffic state that a traffic volume of the first-type movable bodies has decreased from a first reference amount by a first predetermined amount or more and a determination condition that it is recognized from the second traffic state that the second-type movable body is traveling; and a traveling obstruction information providing step of providing traveling obstruction information serving as notification that an event has occurred which obstructs traveling of the first-type movable bodies in the specific road area.

According to the above-described road information providing system, it is possible to provide information as to whether a road is passable in accordance with the size of a movable body.

BRIEF DESCRIPTION OF DRAWINGS

FIG. 2 is a first flowchart of a road information providing process; and

FIG. 3 is a second flowchart of the road information providing process.

DETAILED DESCRIPTION

Figure 1:
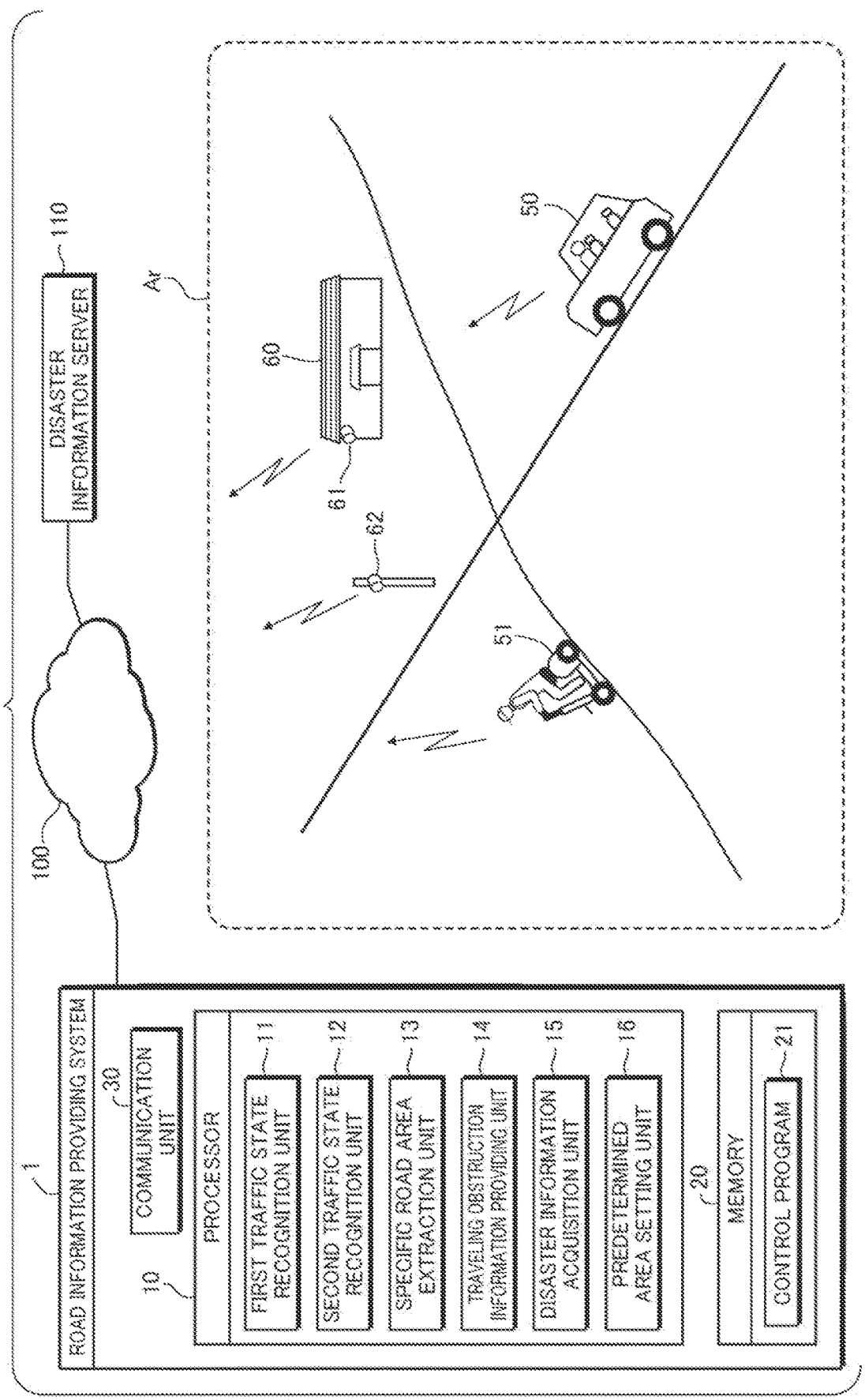
FIG. 1 is a configuration diagram of a road information providing system.

1. Configuration of Road Information Providing System

A configuration of a road information providing system 1 of the present embodiment will be described with reference to FIG. 1. The road information providing system 1 is a computer system including a processor 10, a memory 20, a communication unit 30, and the like. The processor 10 corresponds to a computer of the present disclosure.

The road information providing system 1 communicates with a disaster information server 110, a four-wheeled vehicle 50, a two-wheeled vehicle 51, a monitoring camera 61, a monitoring camera 62, and the like via a communication network 100 by means of the communication unit 30. The four-wheeled vehicle 50 and the two-wheeled vehicle 51 are traveling on roads in a predetermined area Ar. The monitoring camera 61 is installed in a store 60 in the predetermined area Ar. The monitoring camera 62 is installed on the side of a road in the predetermined area Ar. The four-wheeled vehicle 50 corresponds to a first-type movable body of the present disclosure, and the two-wheeled vehicle 51 corresponds to a second-type movable body smaller in size than the first-type movable body of the present disclosure.

The processor 10 executes a control program 21 stored in the memory 20 to function as a first traffic state recognition unit 11, a second traffic state recognition unit 12, a specific road area extraction unit 13, a traveling obstruction information providing unit 14, a disaster information acquisition unit 15, and a predetermined area setting unit 16. Here, processing to be performed by the first traffic state recognition unit 11 corresponds to a first traffic state recognition step in a road information providing method of the present disclosure, and processing to be performed by the second traffic state recognition unit 12 corresponds to a second traffic state recognition step in the road information providing method of the present disclosure. Furthermore, processing to be performed by the specific road area extraction unit 13 corresponds to a specific road area extraction step in the road information providing method of the present disclosure, and processing to be performed by the traveling obstruction information providing unit 14 corresponds to a traveling obstruction information providing step in the road information providing method of the present disclosure.

A large number of the four-wheeled vehicles 50 traveling on roads in the predetermined area Ar transmit traveling information on the four-wheeled vehicles 50. The first traffic state recognition unit 11 receives the traveling information transmitted from the four-wheeled vehicles 50, and recognizes the traffic state (first traffic state) of the four-wheeled vehicles 50 on the roads in the predetermined area Ar. The traveling information transmitted from the four-wheeled vehicle 50 includes information such as the current position, traveling speed, acceleration, and traveling direction of the four-wheeled vehicle 50, detected by various sensors included in the four-wheeled vehicle 50.

A large number of the two-wheeled vehicles 51 traveling on the roads in the predetermined area Ar transmit traveling information on the two-wheeled vehicles 51. The second traffic state recognition unit 12 receives the traveling information transmitted from the two-wheeled vehicles 51, and recognizes the traffic state (second traffic state) of the two-wheeled vehicles 51 on the roads in the predetermined area Ar. The traveling information transmitted from the two-wheeled vehicle 51 includes information such as the current position, traveling speed, acceleration, and traveling direction of the two-wheeled vehicle 51, detected by various sensors included in the two-wheeled vehicle 51.

The specific road area extraction unit 13 extracts, as a specific road area, a road area that satisfies all of determination conditions (1) to (4) below on the basis of the first traffic state and the second traffic state in the predetermined area Ar.

(1) The traffic volume of the four-wheeled vehicles 50 per predetermined time or the traffic volume of the four-wheeled vehicles 50 in a predetermined period of time has decreased from a first reference amount by a first predetermined amount or more. The first reference amount is set to, for example, an average traffic volume of the four-wheeled vehicles 50 per the predetermined time in normal times (when no accident such as a disaster occurs) or an average traffic volume of the four-wheeled vehicles 50 in the predetermined period of time in normal times. The first predetermined amount is set to, for example, 50% of the first reference amount.

(2) The two-wheeled vehicle 51 is traveling.

(3) The traffic volume of the two-wheeled vehicles 51 per predetermined time or the traffic volume of the two-wheeled vehicles 51 in a predetermined period of time has increased from a second reference amount by a second predetermined amount or more. The second reference amount is set to, for example, an average traffic volume of the two-wheeled vehicles 51 per the predetermined time in normal times or an average traffic volume of the two-wheeled vehicles 51 in the predetermined period of time in normal times. The second predetermined amount is set to, for example, 50% of the second reference amount.

(4) Any of the four-wheeled vehicles 50 has backed up or turned around.

When a specific road area is extracted by the specific road area extraction unit 13, the traveling obstruction information providing unit 14 transmits, to the disaster information server 110, traveling obstruction information serving as notification that an event has occurred which obstructs the traveling of the four-wheeled vehicles 50 in the specific road area. The disaster information server 110 transmits the traveling obstruction information to, for example, the four-wheeled vehicles 50 and the two-wheeled vehicles 51 traveling in the predetermined area Ar and four-wheeled vehicles and two-wheeled vehicles traveling toward the predetermined area Ar.

The traveling obstruction information includes an image of the specific road area captured by a camera mounted on the two-wheeled vehicle 51 and transmitted from the two-wheeled vehicle 51 to the road information providing system 1. In addition, the traveling obstruction information may include information serving as notification that there is no hindrance to the two-wheeled vehicles 51 traveling in the specific road area.

The disaster information acquisition unit 15 acquires disaster information transmitted from the disaster information server 110 by receiving the disaster information via the communication unit 30. The predetermined area setting unit 16 recognizes an area where a disaster has occurred from the disaster information acquired by the disaster information acquisition unit 15, and sets the area where a disaster has occurred as the predetermined area Ar from which a specific road area is to be extracted.

2. Road Information Providing Process

With reference to flowcharts shown in FIGS. 2 and 3, a description will be given of a procedure for a road information providing process to be performed by the road information providing system 1 in the situation shown in FIG. 1.

In step S1 of FIG. 2, the disaster information acquisition unit 15 accesses the disaster information server 110 to acquire disaster information. Subsequently, in step S2, the predetermined area setting unit 16 determines whether there is an area where a disaster has occurred, based on the disaster information acquired by the disaster information acquisition unit 15. Then, the predetermined area setting unit 16 causes the process to proceed to step S3 when there is an area where a disaster has occurred, and causes the process to proceed to step S1 when there is no area where a disaster has occurred.

In step S3, the predetermined area setting unit 16 sets the area where a disaster has occurred as the predetermined area Ar from which a specific road area is to be extracted. Subsequently, in step S4, the first traffic state recognition unit 11 receives traveling information transmitted from the four-wheeled vehicles 50 in the predetermined area Ar and captured images transmitted from the monitoring cameras 61 and 62, and recognizes the traffic state (first traffic state) of the four-wheeled vehicles 50 on the roads in the predetermined area Ar.

Next, in step S5, the second traffic state recognition unit 12 receives traveling information transmitted from the two-wheeled vehicles 51 in the predetermined area Ar and captured images transmitted from the monitoring cameras 61 and 62, and recognizes the traffic state (second traffic state) of the two-wheeled vehicles 51 on the roads in the predetermined area Ar. Processing to be performed in subsequent step S6 to step S14 of FIG. 3 corresponds to processing to be performed by the specific road area extraction unit 13.

In step S6, the specific road area extraction unit 13 selects any of a plurality of road areas set in the predetermined area Ar, as a road area (determination road area) for which determination is to be made. Next, in step S7, the specific road area extraction unit 13 recognizes a change in the traffic volume of the four-wheeled vehicles 50 in the selected road area with reference to the first traffic state.

Subsequently, in step S8, the specific road area extraction unit 13 determines whether the traffic volume of the four-wheeled vehicles 50 in the selected road area has decreased by the first predetermined amount or more, based on determination condition (1) above. Then, the specific road area extraction unit 13 causes the process to proceed to step S9 when the traffic volume of the four-wheeled vehicles 50 in the selected road area has decreased by the first predetermined amount or more, and causes the process to proceed to step S16 of FIG. 3 when the traffic volume of the four-wheeled vehicles 50 in the selected road area has not decreased by the first predetermined amount or more.

Next, in step S9, the specific road area extraction unit 13 determines whether the two-wheeled vehicle 51 is traveling in the selected road area, based on determination condition (2) above with reference to the second traffic state. Then, the specific road area extraction unit 13 causes the process to proceed to step S10 of FIG. 3 when the two-wheeled vehicle 51 is traveling in the selected road area, and causes the process to proceed to step S16 of FIG. 3 when no two-wheeled vehicle 51 is traveling in the selected road area.

Subsequently, in step S10 of FIG. 3, the specific road area extraction unit 13 recognizes a change in the traffic volume of the two-wheeled vehicles 51 in the selected road area with reference to the second traffic state. Next, in step S11, the specific road area extraction unit 13 determines whether the traffic volume of the two-wheeled vehicles 51 in the selected road area has increased by the second predetermined amount or more, based on determination condition (3) above. Then, the specific road area extraction unit 13 causes the process to proceed to step S12 when the traffic volume of the two-wheeled vehicles 51 in the selected road area has increased by the second predetermined amount or more, and causes the process to proceed to step S13 when the traffic volume of the two-wheeled vehicles 51 in the selected road area has not increased by the second predetermined amount or more.

Subsequently, in step S12, the specific road area extraction unit 13 determines whether any of the four-wheeled vehicles 50 has backed up or turned around in the selected road area, based on determination condition (4) above with reference to the first traffic state. Then, the specific road area extraction unit 13 causes the process to proceed to step S14 when any of the four-wheeled vehicles 50 has backed up or turned around, and causes the process to proceed to step S16 when no four-wheeled vehicles 50 has backed up or turned around.

In step S14, the specific road area extraction unit 13 extracts the selected road area as a specific road area when the selected road area satisfies all the determination conditions of steps S8, S9, S11, and S13. Next, in step S15, the traveling obstruction information providing unit 14 transmits, to the disaster information server 110, traveling obstruction information serving as notification that an event has occurred which obstructs the traveling of four-wheeled vehicles in the specific road area extracted in step S14.

Subsequently, in step S16, the specific road area extraction unit 13 determines whether, in the predetermined area Ar, there is any road area for which determination has not been made based on determination conditions (1) to (4) above. Then, when there is any road area for which determination has not been made, the specific road area extraction unit 13 causes the process to proceed to step S6 of FIG. 2, and determines whether determination conditions (1) to (4) above are satisfied for the next road area. Meanwhile, when there is no road area for which determination has not been made, the specific road area extraction unit 13 causes the process to proceed to step S17 to end the road information providing process.

3. Other Embodiments

In the above embodiment, there are included the disaster information acquisition unit 15 and the predetermined area setting unit 16, and an area where a disaster has occurred is set as the predetermined area Ar. As another embodiment, the disaster information acquisition unit 15 and the predetermined area setting unit 16 may be omitted such that the predetermined area Ar is set in advance as a fixed area. Alternatively, an area where an event other than a disaster, such as a traffic accident or road construction, has occurred may be set as the predetermined area Ar.

In the above embodiment, the specific road area extraction unit 13 extracts, as a specific road area, a road area satisfying all determination conditions (1) to (4) above. As another embodiment, only determination conditions (1) and (2) above may be used as determination conditions. Alternatively, determination conditions (1), (2), and (3) above, or determination conditions (1), (2), and (4) above may be used as determination conditions.

In the above embodiment, a four-wheeled vehicle has been cited as an example of the first-type movable body of the present disclosure, and a two-wheeled vehicle has been cited as an example of the second-type movable body of the present disclosure. However, the second-type movable body may be any movable body as long as the second-type movable body is smaller in size than the first-type movable body. For example, the road information providing system and the road information providing method of the present disclosure can also be applied to a case where both the first and second-type movable bodies are four-wheeled vehicles and the second-type four-wheeled vehicle is smaller in size (vehicle width or the like) than the first-type four-wheeled vehicle.

Note that FIG. 1 is a schematic diagram showing the configuration of the road information providing system 1, in which the configuration has been divided according to main processing details so as to facilitate understanding of the present invention, and the configuration of the road information providing system 1 may be divided in another manner. In addition, processing to be performed by each constituent element may be executed by a single hardware unit or may be executed by a plurality of hardware units. Furthermore, processing to be performed by each constituent element shown in the flowcharts of FIGS. 2 and 3 may be executed by a single program or may be executed by a plurality of programs.

4. Configurations to Be Supported by Above-Described Embodiment

The above embodiment supports the following configurations.

(Configuration 1) A road information providing system including: a first traffic state recognition unit that recognizes a first traffic state, the first traffic state being a traffic state of first-type movable bodies in a predetermined area; a second traffic state recognition unit that recognizes a second traffic state, the second traffic state being a traffic state of second-type movable bodies in the predetermined area, the second-type movable bodies being smaller in size than the first-type movable bodies; a specific road area extraction unit that extracts, as a specific road area, a road area that satisfies traffic determination conditions, the traffic determination conditions including a determination condition that it is recognized from the first traffic state that a traffic volume of the first-type movable bodies has decreased from a first reference amount by a first predetermined amount or more and a determination condition that it is recognized from the second traffic state that the second-type movable body is traveling; and a traveling obstruction information providing unit that provides traveling obstruction information serving as notification that an event has occurred which obstructs traveling of the first-type movable bodies in the specific road area.

According to the road information providing system of configuration 1, it is possible to provide information as to whether a road is passable in accordance with the size of a movable body.

(Configuration 2) The road information providing system according to configuration 1, in which the traffic determination conditions further include a determination condition that the first-type movable body having backed up or turned around is recognized from the first traffic state.

According to the road information providing system of configuration 2, when any first-type movable body has backed up or turned around, it is possible to provide the traveling obstruction information on the assumption that an event has occurred which obstructs the traveling of the first-type movable bodies.

(Configuration 3) The road information providing system according to configuration 1 or 2, in which the traffic determination conditions further include a determination condition that it is recognized from the second traffic state that a traffic volume of the second-type movable bodies has increased from a second reference amount by a second predetermined amount or more.

According to the road information providing system of configuration 3, when it corresponds to a situation where the traveling of the first-type movable bodies is obstructed and it is thus assumed that the traffic volume of the second-type movable bodies smaller in size has increased, it is possible to provide the traveling obstruction information.

(Configuration 4) The road information providing system according to any one of configurations 1 to 3, in which the traveling obstruction information includes a captured image of the specific road area.

According to the road information providing system of configuration 4, it is possible to provide, as the traveling obstruction information, the captured image of the specific road area which enables the state of the specific road area to be easily checked.

(Configuration 5) The road information providing system according to any one of configurations 1 to 4, in which the second traffic state recognition unit acquires a captured image of the predetermined area transmitted from the second-type movable body traveling in the predetermined area, and recognizes the second traffic state based on the captured image having been acquired.

According to the road information providing system of configuration 5, it is possible to recognize the real-time traffic states in the predetermined area on the basis of the image captured by the second-type movable body actually traveling in the predetermined area.

(Configuration 6) The road information providing system according to any one of configurations 1 to 5, further including: a disaster information acquisition unit that acquires disaster information; and a predetermined area setting unit that sets the predetermined area based on the disaster information.

According to the road information providing system of configuration 6, it is possible to extract an area as the specific road area when it is highly possible that a disaster has brought about a situation where the traveling of the first-type movable bodies is obstructed in the area.

(Configuration 7) A road information providing method to be performed by a computer, the method including: a first traffic state recognition step of recognizing a first traffic state, the first traffic state being a traffic state of first-type movable bodies in a predetermined area; a second traffic state recognition step of recognizing a second traffic state, the second traffic state being a traffic state of second-type movable bodies in the predetermined area, the second-type movable bodies being smaller in size than the first-type movable bodies; a specific road area extraction step of extracting, as a specific road area, a road area that satisfies traffic determination conditions, the traffic determination conditions including a determination condition that it is recognized from the first traffic state that a traffic volume of the first-type movable bodies has decreased from a first reference amount by a first predetermined amount or more and a determination condition that it is recognized from the second traffic state that the second-type movable body is traveling; and a traveling obstruction information providing step of providing traveling obstruction information serving as notification that an event has occurred which obstructs traveling of the first-type movable bodies in the specific road area.

It is possible to obtain the same effects as those of the road information providing system of configuration 1 by performing the road information providing method of configuration 7 by means of a computer

REFERENCE SIGNS LIST 1 road information providing system
10 processor
11 first traffic state recognition unit
12 second traffic state recognition unit
13 specific road area extraction unit
14 traveling obstruction information providing unit
15 disaster information acquisition unit
16 predetermined area setting unit
20 memory
21 control program
30 communication unit
50 four-wheeled vehicle (first-type movable body)
51 two-wheeled vehicle (second-type movable body)
61, 62 monitoring camera.

What is claimed is:

1. A road information providing system comprising a processor, wherein the processor includes:
   a disaster information acquisition unit that acquires, from a disaster information server, disaster information which is information for recognizing an area where a disaster has occurred;
   a predetermined area setting unit that sets, based on the disaster information acquired by the disaster information acquisition unit, the area where the disaster has occurred as a predetermined area from which a specific road area is to be extracted, selects any of a plurality of road areas set in the predetermined area as a road area for which determination is to be made, and receives captured images transmitted from a plurality of monitoring cameras installed in the selected road area for which determination is to be made;
   a first traffic state recognition unit that recognizes, based on the captured images received by the predetermined area setting unit, a first traffic state, the first traffic state being a traffic state of first-type movable bodies in the road area for which determination is to be made;
   a second traffic state recognition unit that recognizes, based on the captured images received by the predetermined area setting unit, a second traffic state, the second traffic state being a traffic state of second-type movable bodies in the road area for which determination is to be made, the second-type movable bodies being smaller in size than the first-type movable bodies;
   a specific road area extraction unit that extracts, as the specific road area, the road area for which determination is to be made that satisfies traffic determination conditions, the traffic determination conditions including a determination condition that it is recognized from the first traffic state that a traffic volume of the first-type movable bodies has decreased from a first reference amount by a first predetermined amount or more and a determination condition that it is recognized from the second traffic state that the second-type movable body is traveling; and
   a traveling obstruction information providing unit that provides traveling obstruction information serving as notification that an event has occurred which obstructs traveling of the first-type movable bodies in the specific road area.

2. The road information providing system according to claim 1, wherein
   the traffic determination conditions further include a determination condition that the first-type movable body having backed up or turned around is recognized from the first traffic state.

3. The road information providing system according to claim 1, wherein
   the traffic determination conditions further include a determination condition that it is recognized from the second traffic state that a traffic volume of the second-type movable bodies has increased from a second reference amount by a second predetermined amount or more.

4. The road information providing system according to claim 1, wherein
   the traveling obstruction information includes the captured image of the specific road area.

5. The road information providing system according to claim 1, wherein
   the second traffic state recognition unit acquires a second captured image of the predetermined area transmitted from the second-type movable body traveling in the predetermined area, and recognizes the second traffic state based on the second captured image having been acquired.

6. A road information providing method to be performed by a computer, the method comprising:
   a disaster information acquisition step of acquiring, from a disaster information server, disaster information which is information for recognizing an area where a disaster has occurred;
   a predetermined area setting step of setting, based on the disaster information acquired, the area where the disaster has occurred as a predetermined area from which a specific road area is to be extracted, selecting any of a plurality of road areas set in the predetermined area as a road area for which determination is to be made, and receiving captured images transmitted from a plurality of monitoring cameras installed in the selected road area for which determination is to be made;
   a first traffic state recognition step of recognizing, based on the captured images received, a first traffic state, the first traffic state being a traffic state of first-type movable bodies in the road area for which determination is to be made;
   a second traffic state recognition step of recognizing, based on the captured images received, a second traffic state, the second traffic state being a traffic state of second-type movable bodies in the road area for which determination is to be made, the second-type movable bodies being smaller in size than the first-type movable bodies;
   a specific road area extraction step of extracting, as the specific road area, the road area for which determination is to be made that satisfies traffic determination conditions, the traffic determination conditions including a determination condition that it is recognized from the first traffic state that a traffic volume of the first-type movable bodies has decreased from a first reference amount by a first predetermined amount or more and a determination condition that it is recognized from the second traffic state that the second-type movable body is traveling; and
   a traveling obstruction information providing step of providing traveling obstruction information serving as notification that an event has occurred which obstructs traveling of the first-type movable bodies in the specific road area.

\* \* \* \* \*